Sept. 8, 1959      O. S. RUDMAN      2,903,081

WHEEL-MOUNTING MEANS AND DRIVE ASSEMBLY

Filed July 26, 1957

INVENTOR,
OSCAR SIGMUND RUDMAN

BY Cohn and Powell

ATTORNEYS.

United States Patent Office 2,903,081
Patented Sept. 8, 1959

2,903,081

WHEEL-MOUNTING MEANS AND DRIVE ASSEMBLY

Oscar Sigmund Rudman, St. Louis, Mo.

Application July 26, 1957, Serial No. 674,479

6 Claims. (Cl. 180—19)

This invention relates generally to improvements in a lawnmower, and more particularly to an improved wheel-mounting means and drive assembly.

It is an important object of the present invention to realize an improved mechanism that enables selectively a lawnmower to be utilized either as a free-wheeling or self-propelled unit.

Another important objective is achieved by the structural arrangement and relation of a wheel-mounting means with a drive element operatively connected to power means carried by the mower frame deck, and by the provision of means for selectively actuating the wheel-mounting means to afford the above mentioned functional results and advantages.

Still another important object is provided by mounting of a ground wheel to a plate member pivoted to the mower frame, the rotative axis of the wheel being offset from the pivotal axis of the plate member, and by the engagement of a handle with the plate member that causes the wheel to be moved into and out of operative engagement with a drive pinion upon pivotal movement of the plate member by such handle.

Yet another important object is realized by the provision of a resilient means connected between the pivoted plate member of the wheel-mounting mechanism and the mower frame which tends to urge the ground wheel into driven engagement with the drive pinion.

Other important advantages are achieved by the hinge connection of the handle and its normal engagement with the pivoted plate member so that its weight counterbalances the reactive force of the resilient means to hold the ground wheels away from the drive pinions.

Other important objectives are afforded by the provision of a tie rod interconnecting the pivoted plate members located on opposite sides of the mower frame which causes the ground wheels carried by such plate members to be actuated in unison as a unitary structure for cooperation selectively with the drive assembly.

Another important object is realized by providing a wheel-mounting means and coacting drive assembly that is simple and durable in construction, efficient and positive in operation, economical to manufacture and capable of ready use by anyone without requiring any complicated instructions.

The foregoing and numerous other objects and advantages of the invention will more clearly appear from the following detailed description of a preferred embodiment, particularly when considered in connection with the accompanying drawing, in which.

Figure 1:
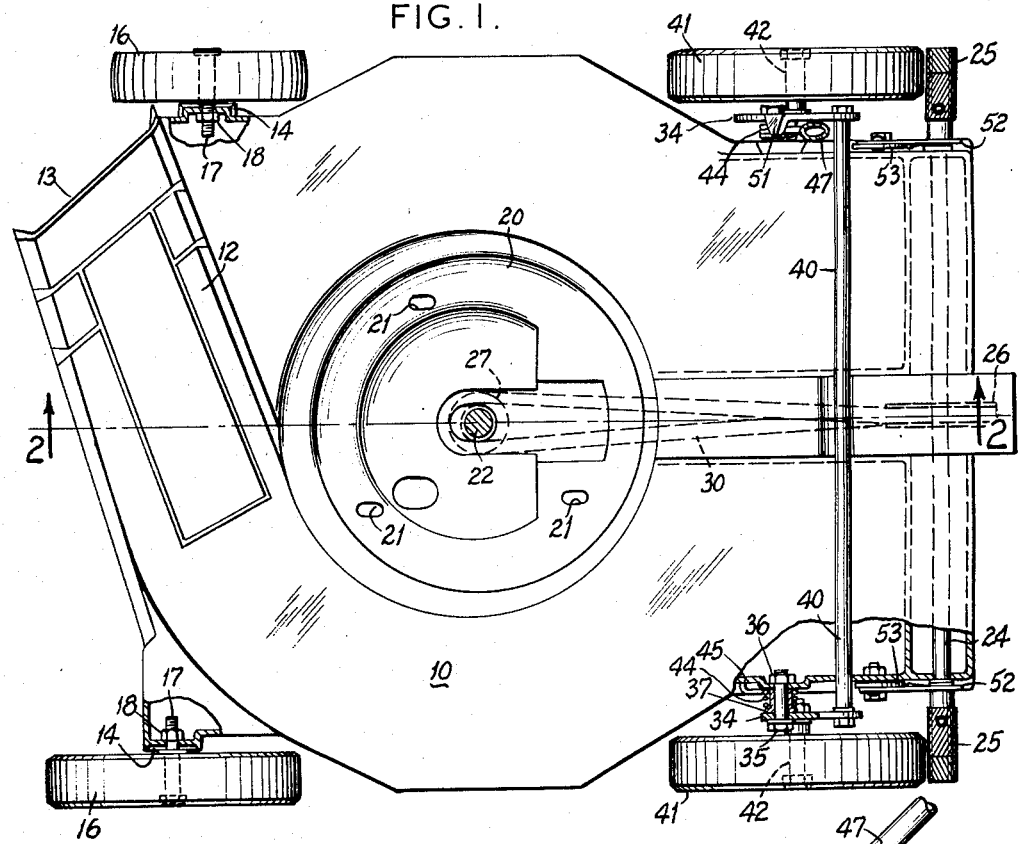
Fig. 1 is a top plan view of the lawnmower frame deck with portions cut away and shown in cross section to illustrates the mounting of the ground wheels and the relationship of particular ground wheels with a drive assembly.

Referring now by characters of reference to the drawing, the lawnmower includes a frame deck having an upper wall 10 and depending skirt portions 11 which provide a cutting chamber. Formed in the front portion of the frame deck is a discharge chute 12 that communicates with the cutting chamber defined by upper wall portion 10 and skirt portions 11, and opens at the front side of the frame deck with a discharge port 13.

Fixed to skirt portion 11 at each side of the mower frame is an elongate plate 14 in which a plurality of vertically spaced apertures 15 are provided. A pair of front ground wheels 16 is secured to the front portion of the mower frame by bolt axles 17 and cooperating nuts 18. The bolt axles 17 are selectively extended through one of the apertures 15 formed in plate 14, extended through the adjacent skirt portion 11, and then fixed to the frame by a nut 18. The selection of the particular aperture 15 in which the wheel bolt axle 17 is located depends upon the desired height of cut, the relatively higher placed apertures 15 being utilized for a lower cut of grass while the lower placed apertures are utilized for a corresponding higher cut.

Formed in the center of top wall 10 of the mower frame deck is a step formation 20 in and on which a suitable power means (not shown) is mounted and seated. As shown in Fig. 1, a portion of step formation 20 is provided with a plurality of elongate slots 21 in and through which the bolts utilized to secure the power unit to the frame deck extend, such bolts being slidably adjustable within slots 21 to vary the belt tension.

The power unit includes a drive shaft shown generally at 22 extending vertically through the center portion of the step formation 20 and within the depending skirt portions 11. Fixed to the lower end of drive shaft 22 is a cutting blade 23 which is adapted to rotate in a horizontal plane slightly above the lower margin of skirt portion 11.

A drive shaft 24 is extended transversely of the rear portion of the mower frame and is mounted for rotation at each side of the frame. A drive pinion 25 is fixed to each end of drive shaft 24 and is located laterally outward of the frame deck.

Fixed securely to the center of drive shaft 24 is a pulley 26. A cooperating pulley 27 is attached to drive shaft 22 within the step formation 20. The pulleys 26 and 27 are operatively interconnected by a belt 30 that extends through an aperture 31, Fig. 2, and below the upper deck wall 10. A cover plate 32 is secured to the rear portion 33 of the frame deck, the plate 32 extending forwardly underneath the pulley and belt structure, around the drive shaft 22 below pulley 27, and substantially enclosing the center opening provided through step formation 20. It is seen that the cover plate 32 shields the power unit and the pulley and belt connection from grass cuttings.

Located on each side of the frame deck is a plate member 34 that is pivoted to the mower frame by a pivot bolt 35 and cooperating nut 36. A spacer sleeve 37 is located on pivot bolt 35 and is located between the frame and plate member 34, the sleeve 37 retaining the plate member 34 in spaced relation to the frame. A tie rod 40 extends between and is fixed to the plate members 34 located at each side of the mower frame to provide a unitary structure. As will hereinafter appear tie rod 40 constitutes an abutment on plate members 34 for the handle 47.

Carried by each of plate members 34 is a rear ground wheel 41 fixed by an axle bolt 42, the rotatable axis of the axle bolt 42 being offset yet parallel to the pivotal axis of plate member 34 defined by pivot bolt 35. A plurality of apertures 43 are provided in each of plate members 34 in and through which the rotatable axle bolt 42 of the ground wheel 41 may be located, the selection of the particular aperture 43 being dependent upon the height of cut desired.

It will be particularly noted that the drive pinions 25 are located in the path of ground wheels 41 upon pivotal movement of the plate members 34 about their pivotal connection. The drive pinions 25 are operatively connected to the power means at all times by the above described belt and pulley connection. When ground wheels 41 are moved into engagement with drive pinions 25, the ground wheels 41 are driven by the power means to propel the lawnmower.

A torsion spring 44 constituting a resilient means is disposed operatively between the mower frame and each plate member 34, and more particularly is located around spacer sleeve 37 of each pivot bolt 35, one end 45 of spring 44 being fixed to the mower frame and the opposite end 46 being attached operatively to the plate member 34.

Figure 2:
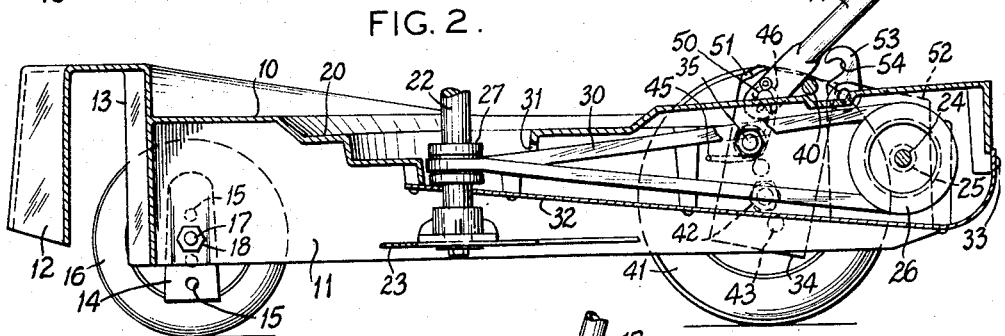
Fig. 2 is a view in cross section of the mower unit as seen along lines 2—2 of Fig. 1.

A handle used to guide and at times cause propulsion of the lawnmower includes side portions 47 that are pivotally connected by studs 50 to plate members 34, the studs 50 being located forwardly of tie rod 40. The pins 50 and tie rod 40 are each particularly located with respect to the pivotal axis of pivot bolt 35 so that the handle angularly disposed in its normal at rest position shown in Fig. 2 engages the tie rod 40, and the weight of the handle acting through tie rod 40 tends to rotate the plate members 34 clockwise (Fig. 2) about pivot connection 35. It will be particularly noted that the action of torsion springs 44 tends to rotate the plate members 34 in the opposite direction, i.e. counterclockwise (Fig. 2), and are particularly adapted to counterbalance the weight of handle 47, so that the resultant action is such that the ground wheels 41 are maintained out of driven relation with drive pinions 25 as is shown in Fig. 2.

Figure 3:
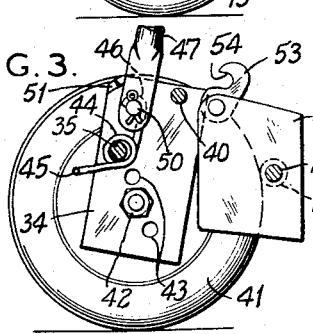
Fig. 3 is a fragmentary view of the wheel-mounting means shown in Fig. 2 but showing the handle raised and the wheel operatively engaging the drive pinion.

When it is desired to connect the driving means operatively with the ground wheels 41 to provide a self-propelled unit, the handle portions 47 are simply raised out of operative engagement with tie rod 40 to enable the torsion springs 44 to rotate plate members 34, and hence move ground wheels 41 rearwardly into engagement with drive pinions 25 as is shown in Fig. 3.

When it is desired to disengage the driving means, the handle portions 47 are simply lowered to engage the tie rod 40. Hence plate members 34 are pivoted either by the handle weight on tie rod 40 or by manually depressing handle 47 against tie rod 40, whereby ground wheels 41 are swung out of operative engagement with drive pinions 25.

It will be particularly noted as a desirable safety feature that when the handle is not manually held or is manually released by the operator, the handle under its own weight will assume an angular position to engage and rest on tie rod 40. As stated previously, the weight of the handle in engaging tie rod 40 counterbalances the reactive forces of torsion springs 44 and maintains the plate members 34 in a pivotal position so that wheels 41 are operatively disengaged from drive pinions 25. Thus it is seen that the mower will not become self-propelled until the handle is manually lifted. To prevent handle from being swung past a vertical position about pivot studs 50, a stop portion 51 is provided on each of plate members 34 adapted to engage handle portions 47, and thus assures that the handle will move or fall against tie rod 40 when released.

Figure 4:
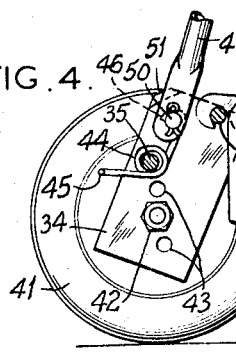
Fig. 4 is a fragmentary view of the wheel-mounting means similar to Fig. 3 but showing the latch arm in operative position.

A plate 52 is located at each side of the mower frame, each plate 52 being fixed to the frame and mounted over drive shaft 24. Pivotally connected to each plate 52 is a latch arm 53 that includes a hook recess 54. When it is desired to utilize the lawnmower as a free wheeling unit operatively disengaged from the power means, the handle portions 47 are depressed against tie rod 40 to pivot plate members 34 about their pivot connection so as to move the ground wheels 41 away from and out of operative driving engagement with drive pinions 25. In this position, the latch arms 53 are moved to engage tie rod 40 as shown in Fig. 4, the rod 40 entering the hook recesses 54. The latch arms 53 prevent the plate members 34 from being pivotally moved in one direction and preclude the ground wheels 41 from being moved into driving relation with the drive pinions 25 under the reactive force of torsion springs 44.

To condition the lawnmower for self-propelling operation, the latch arms 53 are lifted to disengage operatively from tie rod 40. Then, the reactive force of torsion springs 44 is operable through plate members 34 to swing the ground wheels 41 into operative engagement with drive pinions 25 upon lifting of the handle portions 47.

Although the invention has been described by making detailed reference to a single preferred embodiment, such detail is to be understood in an instructive, rather than in any restrictive sense, many variants being possible within the scope of the claims hereunto appended.

I claim as my invention:

1. In a lawnmower, a frame, a plate member located on each side of side frame, pivot means connecting each plate member to said frame, said plate members each having a plurality of apertures in corresponding, vertically spaced relation, ground wheels, means for attaching a ground wheel to each plate member selectively at one of said apertures, a tie rod extending between and fixed to said plate members, a power means carried on said frame, a drive element fixedly positioned on each side of the frame operatively connected to said power means, each drive element being disposed in the path of one of said wheels upon pivotal movement of said plate members, resilient means connected between each of the plate members and the frame tending to urge said pivoted plate members in a direction operatively to engage the wheels with said drive elements, and a hinged handle having portions engageable with said tie rod to pivot said plate members and move said wheels out of driven relation with the drive elements.

2. The combination and arrangement of elements as recited above in claim 1, but further characterized in that the handle portions are pivotally attached to said plate members, and that said handle portions selectively engage the tie rod to counterbalance the resilient means and selectively pivot said plate members to move said wheels away from said drive elements.

3. In a lawnmover, a frame, a plate member located on each side of said frame, pivot means connecting each plate member to said frame, a ground wheel attached to each plate member, each said ground wheel having its rotatable axis offset from yet parallel to the pivotal axis of the plate member, a tie rod extending between and fixed to said plate members, a power means carried on said frame, a drive element on each side of said frame operatively connected to said power means, each drive element being disposed in the path of one of said wheels upon pivotal movement of said plate members, resilient means connected between each of the plate members and the frame tending to urge said pivoted plate members in a direction operatively to engage the wheels with said drive elements, a hinged handle having portions arranged at an angle to the vertical normally engaging the tie rod to counterbalance said resilient means, said handle portions selectively engaging the tie rod to pivot said plate members in a direction to move said wheels away from said drive elements, and stop means engaging said handle to prevent movement past the vertical to assure engagement of the handle portions and the rod upon release of the handle.

4. In a lawnmower, a frame, a pair of plate members, one disposed on each side of said frame, pivot means pivotally connecting each of said plate members to said frame, a ground wheel attached to each plate member, a tie bar extending between and fixed to said plate members to provide a unitary structure, a power means carried on said frame, a drive shaft mounted transversely on said frame, means operatively connecting said power means to said drive shaft, a drive pinion attached to each end of said drive shaft, each pinion being disposed in the path of one of said ground wheels upon pivotal movement of the plate members, each ground wheel having its rotatable axis offset from the pivot axis of the plate member on which it is carried, a resilient element disposed at each side of said frame, each resilient element being connected to the frame and to one of said plate members tending to urge said plate member in a direction to cause engagement of said wheels and pinions, said tie rod being located offset from the vertical through the pivot axis of said plate members toward the drive pinions, a hinged handle having portions engaging said tie rod so that upon movement of said handle in one direction said handle portions pivot said pivoted plate members in a direction to cause operative disengagement of said wheels from said drive pinions, and at least one latch arm pivoted to said frame, said latch arm engaging the tie rod to hold the wheels out of operative engagement with said drive pinions.

5. In a lawn mower, a frame, a plate member located on each side of said frame, pivot means connecting each plate member to said frame, said plate members each having a plurality of apertures in corresponding, vertically spaced relation, ground wheels, means for attaching a ground wheel to each plate member selectively at one of said apertures, abutment means on said plate members, a power means carried on said frame, a drive element fixedly positioned on each side of the frame operatively connected to said power means, each drive element being disposed in the path of one of said wheels upon pivotal movement of said plate members, resilient means connected between each of the plate members and the frame tending to urge said pivoted plate members in a direction operatively to engage the wheels with said drive elements, and a hinged handle having portions engageable with said abutment means to pivot said plate members and move said wheels out of driven relation with the drive elements.

6. In a lawn mower, a frame, a plate member located on each side of said frame, pivot means connecting each plate member to said frame, a ground wheel attached to each plate member, each said ground wheel having its rotatable axis offset from, yet parallel to the pivotal axis of the plate member, abutment means projecting from and fixed to said plate members, a power means carried on said frame, a drive element on each side of said frame operatively connected to said power means, each drive element being disposed in the path of one of said wheels upon pivotal movement of said plate members, resilient means connected between each of the plate members and the frame tending to urge said pivoted plate members in a direction operatively to engage the wheels with said drive elements, a pivotally mounted handle carried by said frame, said handle normally extending at an angle to the vertical, said handle being movable downwardly to engage said abutment means and to pivot said plate members in a direction to move said wheels away from drive elements.

References Cited in the file of this patent

UNITED STATES PATENTS

| | | |
|---|---|---|
| 2,522,112 | Gilmour | Sept. 12, 1950 |
| 2,604,747 | Bash | July 29, 1952 |
| 2,623,603 | Cutlan et al. | Dec. 30, 1952 |
| 2,630,185 | Adams | Mar. 3, 1953 |
| 2,771,959 | Phelps | Nov. 27, 1957 |
| 2,824,415 | Frazier | Feb. 25, 1958 |